United States Patent [19]
Uchino et al.

[11] Patent Number: 5,374,804
[45] Date of Patent: Dec. 20, 1994

[54] LASER HEAD DEVICE
[75] Inventors: Yukio Uchino, Odawara, Japan; Konrad Popp, Augsburg, Germany
[73] Assignee: Amada Company, Limited, Japan
[21] Appl. No.: 946,345
[22] Filed: Nov. 9, 1992
[21] Appl. No.: 946,345
[22] PCT Filed: Mar. 9, 1992
[86] PCT No.: PCT/JP92/00281
  § 371 Date: Nov. 9, 1992
  § 102(e) Date: Nov. 9, 1992
[87] PCT Pub. No.: WO92/16333
  PCT Pub. Date: Oct. 1, 1992
[30] Foreign Application Priority Data
  Mar. 12, 1991 [JP] Japan .................................. 3-46730
[51] Int. Cl.⁵ .............................................. B23K 26/08
[52] U.S. Cl. ................................................ 219/121.78
[58] Field of Search ................. 219/121.78, 121.79; 362/259; 901/15, 42

[56] References Cited

U.S. PATENT DOCUMENTS 5,132,887 7/1992 Torii et al. ............................. 362/259

FOREIGN PATENT DOCUMENTS 2-179381 7/1990 Japan .
08620 8/1990 WIPO ............................. 219/121.79

Primary Examiner—C. L. Albritton
Attorney, Agent, or Firm—Wigman, Cohen, Leitner & Myers

[57] ABSTRACT

A laser head device including a nozzle supporting shaft (11) which is formed in the shape of a pipe through which laser beams (LB) pass, characterized in that the shaft is vertically movably supported in a frame of a laser processing apparatus and is rotatable about its axis so that it acts both as a protecting pipe for the laser beams (LB) and as a rotary shaft. The object is to provide a laser head device which is simple, compact and lightweight in comparison with conventional ones.

3 Claims, 3 Drawing Sheets

LASER HEAD DEVICE

TECHNICAL FIELD

This invention relates to a new laser head device for projecting laser beams onto a workpiece in laser-beam cutting operations by a laser processing apparatus.

BACKGROUND ART

Conventionally, a laser head device of a three-dimentional processing type is used in laser cutting of a three-dimentional figure (solid) workpiece by a laser processing apparatus. The laser head device is comprised of a Z-axis moving body movable upwardly and downwardly (in a Z-axis direction), a A-axis rotary body rotatable about an axis of the Z-axis moving body (in a A-axis direction), and a B-axis rotary body rotatable about an axis perpendicular to the A-axis rotary body (in a B-axis direction) and carrying at its lower end a nozzle.

In a mechanism for driving the Z-axis moving body, the output of a Z-axis motor is reduced in speed by a pair of bevel gears and transmitted to a pinion wherein rotation of the pinion is converted into vertical linear motion of a rack. The rack is fixed to the Z-axis moving body, and therefore the Z-axis moving body moves in the Z-axis direction while being guided by a linear motion guide.

Also, in a mechanism for driving the B-axis rotary body, the output of a B-axis motor which is secured to the A-axis rotary body, is transmitted to a spur gear attached to the B-axis rotary body, and therefore the B-axis rotary body rotates in the B-axis direction.

By the way, in order to drive or move the Z-axis moving body of the above-mentioned conventional laser head device in the Z-axis direction, the driving power is transmitted through three pairs of gears the pairs of which require an intricate backlash cancelling mechanism which is difficult to be assembled and maintained. Furthermore, the Z-axis moving body needs a balancer such as a spring because of heavy weight of the Z-axis moving body.

For cancelling a backlash of a spur gear and a pinion to rotate the A-axis rotary body, the spur gear is divided into two pieces in the direction of its thickness, and phases of the two pieces are slightly shifted, thereby a tooth of the pinion is pinched therebetween. Furthermore, the A-axis rotary body is therein provided with a pipe body through which laser beams pass. Thus, the structure of the device is complicated, which makes assembling of it difficult.

In addition, a backlash cancelling mechanism is required to rotate the B-axis rotary body as required for the A-axis rotary body, and the B-axis rotary body may seriously be in contact with a workpiece. Furthermore, due to its structure, the spur gear cannot be provided with dust-proof means and as a result gathers rust or spatters produced during laser processing. The spur gear also requires slip rings for relaying a cable of the B-axis motor, which will cause a rise in cost.

The object of the present invention is to improve the above-mentioned problems and to provide a laser head device which is simple, compact, and lightweight as a whole in structure wherein a A-axis rotary body serves both as a protecting means for protecting and allowing laser beams to pass therethrough and a rotary shaft.

DISCLOSURE OF INVENTION

In order to achieve the above object, a laser head device of the present invention in a laser processing apparatus includes a laser head vertically movable and rotatable about a vertical axis, characterized in that the laser head device comprises a nozzle supporting shaft for supporting at its lower end a laser nozzle, the nozzle supporting shaft being formed in the shape of a pipe through which laser beams are able to pass and vertically movably mounted on a frame of the laser processing apparatus, the nozzle supporting shaft being provided rotatably about an axis thereof, wherein the nozzle supporting shaft serves both as a laser beam guide pipe and a rotary shaft.

The above-mentioned laser head device is, for example, characterized in that the nozzle supporting shaft is a pipe-shaped ball screw spline shaft, and the spline shaft is vertically movably guided and supported by a ball screw nut portion and a ball spline nut portion disposed on the frame of the laser processing apparatus.

In an embodiment, a laser head device of the present invention comprises a ball screw nut and a ball spline nut rotatably and fixedly mounted on a frame of a laser processing apparatus, the ball screw nut and the ball spline nut being spaced from each other; a ball screw spline shaft inserted and supported in both nuts in a vertically movable and rotatable manner, the ball screw spline shaft carrying at its lower end a laser nozzle so that the laser nozzle is rotatable about an axis perpendicular to the ball screw spline shaft; and a shaft for rotating the laser nozzle, the shaft being formed in the shape of a pipe through which laser beams pass and rotatably disposed in the ball screw spline shaft.

According to the laser head device of the present invention, the nozzle supporting shaft serves both as a protection pipe for the laser beams and a rotary shaft. The laser head device becomes simple since the nozzle supporting shaft which carries at its lower end the laser nozzle is formed in the shape of a pipe for guiding laser beams and is rotatable about its axis.

BEST MODE FOR CARRYING OUT THE INVENTION

Now the present invention will be explained in detail with reference to the accompanying drawings which shows preferred embodiments of the invention.

Figure 1:
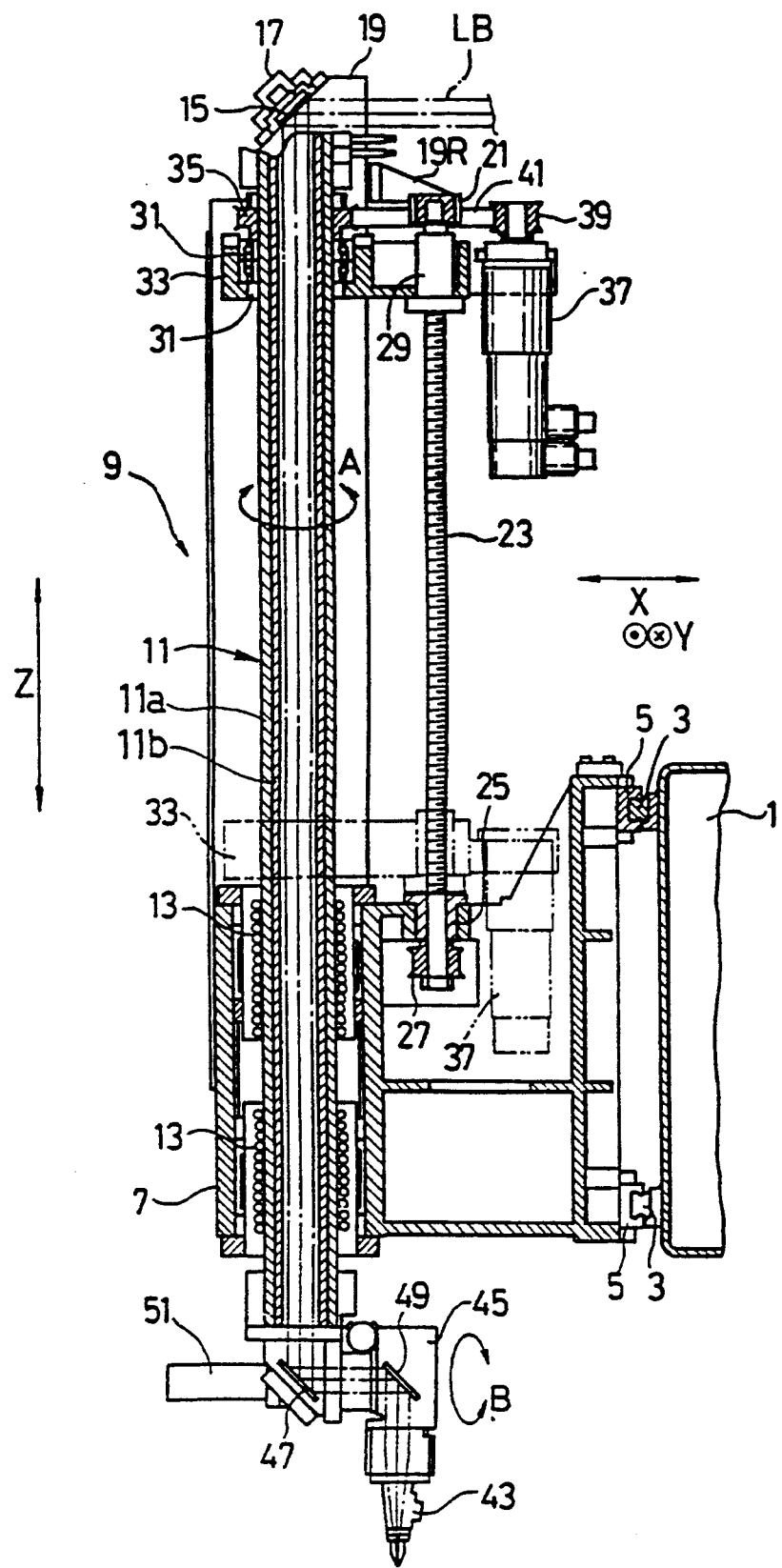
FIG. 1 is a vertical sectional view showing a laser head device of a first embodiment of the present invention.

FIG. 1 shows a laser head device of a first example embodying the present invention. An X-axis carriage 1 extending in a direction Y (in the direction perpendicular to the drawing sheet) is provided. The X-axis carriage 1 is movable in a direction X (to the right and left in FIG. 1) and is attached, for example, to an X-axis frame of a laser processing apparatus both of which are omitted from the drawing.

The X-axis carriage 1 is provided with two guide rails 3 extending in the direction Y. A Y-axis moving body 7, which is movable in the direction Y, is mounted on the guide rails 3 through guide members 5. A laser head device 9 for the laser processing apparatus is mounted on the Y-axis moving body 7.

The laser head device 9 includes a A-axis moving body 11 which vertically extends (in a direction Z) and also acts as a Z-axis moving body as a laser nozzle supporting shaft. The A-axis moving body 11 is a hybrid structure comprised of outer and inner pipes 11a and 11b which are superimposed so as to rotate relatively to each other. Furthermore, the A-axis moving body 11 is vertically movably guided with respect to the Y-axis moving body 7 through a plurality of needle bearings 13 unified with ball bushes.

At an upper end of the A-axis moving body 11 a beam bending mirror device 17, including a beam bending mirror 15, is attached to a supporting bracket 19. The inner pipe 11b of the A-axis moving body 11 is secured to the bracket 19. A vertically extending ball screw 23 is provided under a right-hand portion 19R (FIG. 1) of the bracket 19. An upper end of the ball screw 23 is rotatably supported by the right-hand portion 19R through a bearing 21, while a lower end of the ball screw 23 is rotatably supported by the Y-axis moving body 7 through a bearing 25.

A pulley 27 is fitted over the lower end of the ball screw 23. The pulley 27 is engaged and driven by a Z-axis drive motor (not shown) through a timing belt and a pulley (not shown). A nut 29 is threadably mounted on the upper end portion of the ball screw 23. A supporting frame 33 is supported by the A-axis moving body 11 through a plurality of bearings 31, and a right-hand portion (in FIG. 1) of the supporting frame 33 is fixed to the nut 29.

In addition, above the supporting frame 33, a pulley 35 is fitted over the outer pipe 11a of the A-axis moving body 11, while an A-axis drive motor 37 is attached to a right-hand portion of the supporting frame 33. A drive pulley 39 is fitted over an output shaft of the A-axis drive motor 37. A timing belt 41 is expanded between this drive pulley 39 and the pulley 35.

Accordingly, when the said Z-axis motor (not shown) is operative the ball screw 23 rotates through the drive pulley 39, the timing belt 41 and the pulley 35. The rotation of the ball screw 23 causes, through the nut 29 and the supporting frame 33, the A-axis moving body 11 to move vertically. When the A-axis drive motor 37 is operative the outer pipe 11a of the A-axis moving body 11 is rotated about the axis thereof or in the A-axis direction through a predetermined angle around the inner pipe 11b through the timing belts 41 and the pulley 35.

The outer pipe 11a of the A-axis moving body is provided at its lower end with a B-axis moving body 45 to which a laser nozzle 43 is attached. Reflectors 47, 49 are disposed in the B-axis moving body 45. A B-axis motor 51 for rotating the B-axis moving body is attached to a lower end of the A-axis moving body 11. The B-axis moving body is rotated about an axis perpendicular to the A-axis moving body 11, or in a direction B, for example, through a plurality of gears.

Thus, laser beams LB are refracted by the beam bending mirror 15 to be passed in the pipes of the A-axis moving body 11 and then refracted by reflector mirrors 47 and 49 disposed in the B-axis moving body to be projected downwardly from the laser nozzle 43 to a workpiece (not shown) for laser processing. When the workpiece is a three-dimentional figure (solid), the laser processing may be easily performed by not only vertically moving the A-axis moving body 11 but also rotating the A-axis and B-axis moving bodies 11 and 45 respectively in the A-axis and B-axis directions.

Furthermore, the A-axis moving body 11 acts both as a protecting pipe for the laser beams LB and a rotary shaft when rotating in the A-axis direction. The laser head device 9, therefore, can become lightweight and compact.

Figure 2:
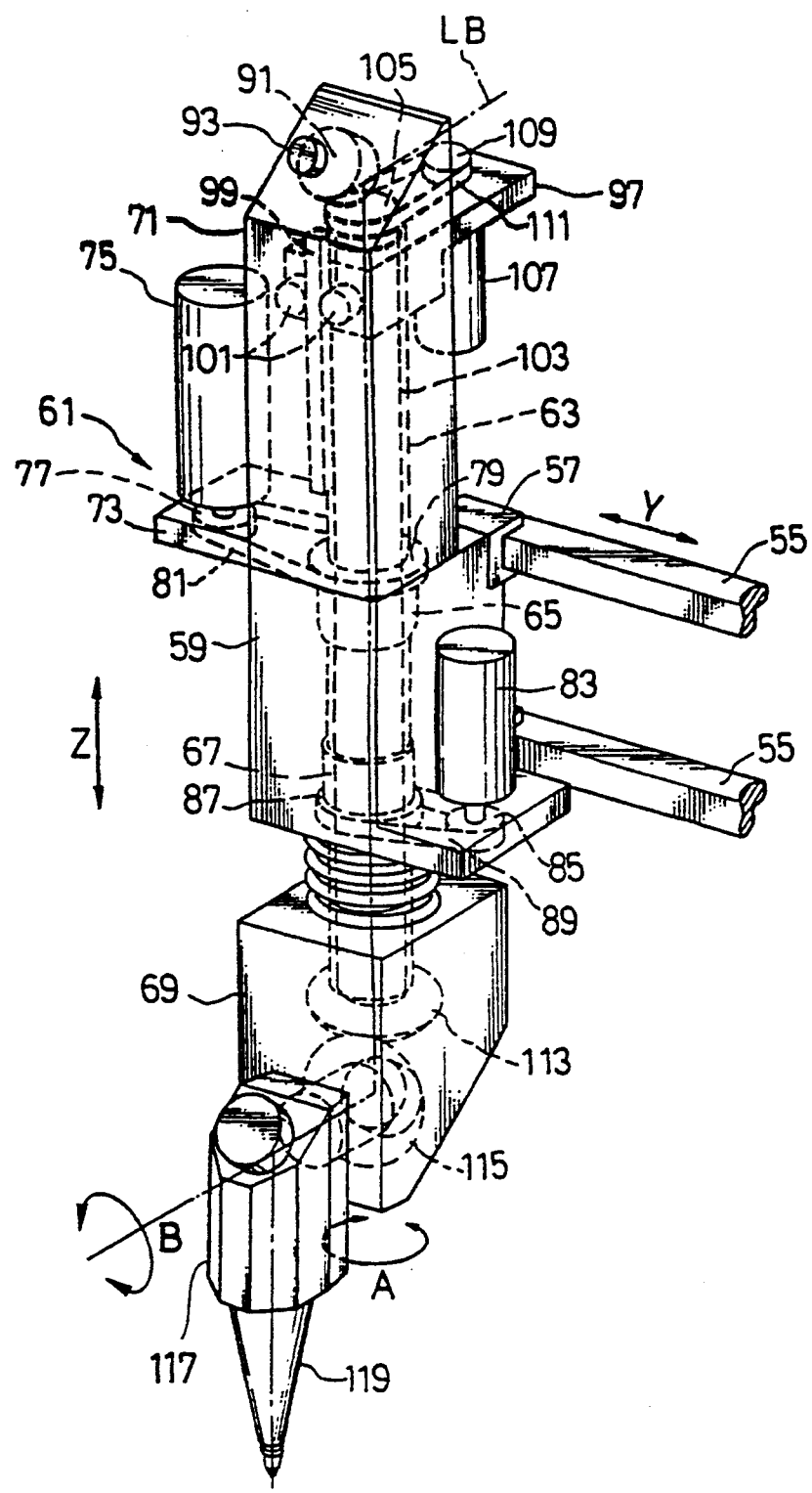
FIG. 2 is a perspective view showing a laser head device of a second embodiment of the present invention.
Figure 3:
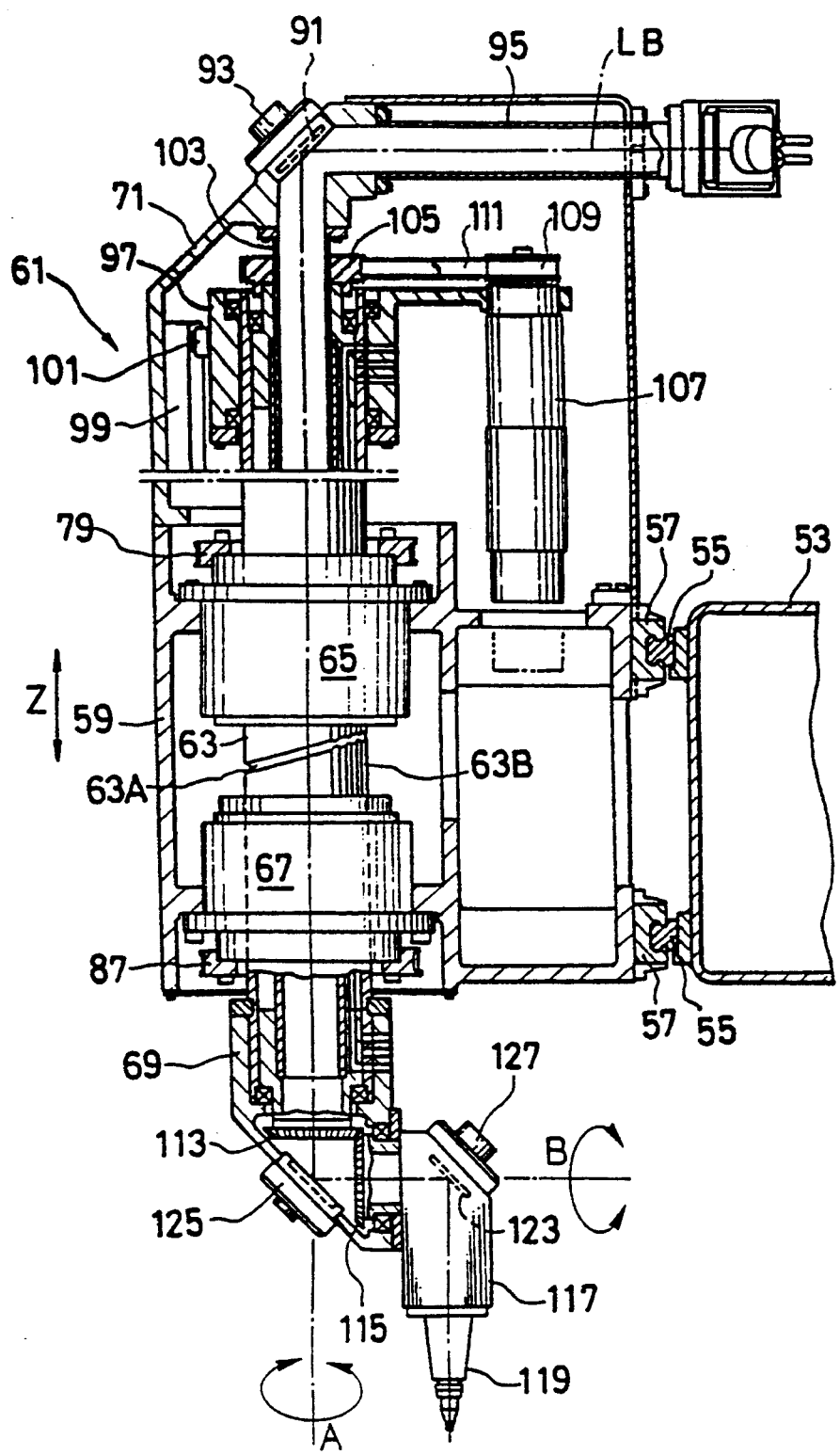
FIG. 3 is a vertical sectional view of the laser head device shown in FIG. 2.

Next, a second example embodying the present invention is shown in FIGS. 2 and 3. In the drawings, an X-axis carriage 53 (FIG. 3) extending in a direction Y (right- and left-ward directions in FIG. 2, in a direction perpendicular to the drawing sheet in FIG. 3) is such provided that it moves in a direction X (right- and left-ward directions in FIG. 3), for example, with respect to an X-axis frame (not shown).

Two parallel guide rails 55, 55 are attached to the X-axis carriage 53, and a Y-axis moving body 59 is such mounted on the guide rails 55, 55 through guide members 57 that it moves in a direction Y. A laser head device 61 is attached to the Y-axis moving body 59.

More particularly, a hollow ball screw spline shaft 63 of a laser head device 63 is so provided as to act as a laser nozzle supporting shaft. The ball screw spline shaft 63 extends upwardly and downwardly (in a direction Z). An outer shaft of the ball screw spline shaft 63 is formed on its outer circumferential surface with a spiral ball screw groove 63A and vertical ball spline grooves 63B.

The ball screw groove 63A is threadably engaged by a ball screw nut 65, while the ball spline grooves 63B are engaged by a ball spline nut 67. A A-axis rotary body 69 is attached to a lower portion of the ball screw spline shaft 63.

A Z-axis base 71 is integrally mounted on the Y-axis moving body 59, and a Z-axis motor base 73 is provided between the Y-axis moving body 59 and the Z-axis base 71. A Z-axis drive motor 75 is mounted on the Z-axis motor base 73. A drive pulley 77 is fitted over an output shaft of the Z-axis drive motor 75. Further, a pulley 79 is fitted over an outer surface of the ball screw nut 65. A timing belt 81 is expanded between this pulley 79 and the drive pulley 77.

The Y-axis moving body 59 is provided with a A-axis drive motor 83. A drive pulley 85 is fitted over the output shaft of the drive motor 83. Further, a pulley 87 is fitted over an external circumferential surface of the ball spline nut 67, and a timing belt 89 is expanded between this pulley 87 and the drive pulley 85.

A reflector device 93 including a reflector 91 is disposed on an upper part of the Z-axis base 71. The reflector device 93 is connected at its right-hand end (in FIG. 3) to a laser pipe 95 which extends in a direction X for allowing laser beams LB to pass therein.

A B-axis motor base 97 is rotatably supported, through a plurality of bearings, on an external circumferential portion of an upper portion of the ball screw spline shaft 63. Further, the Z-axis base 71 is provided with a guide bar 99 extending in the Z-axis direction, A pair of guide rollers 101 to be guided by the guide bar 99 are rotatably attached to the B-axis motor base 97.

A pipe-shaped B-axis shaft 103, which extends in the Z-axis direction, is disposed in the ball screw spline shaft 63. A pulley 105 is fitted over an external circumferential surface of an upper portion of the B-axis shaft 103 and is also attached to an upper portion of the ball screw spline shaft 63. The B-axis motor base 97 is provided on its right-hand portion (in FIG. 3) with a B-axis drive motor 107, and a drive pulley 109 is fitted over an output shaft of the B-axis drive motor 107. A timing belt 111 is expanded between this drive pulley 109 and the said pulley 105.

A bevel gear 113 is secured to a lower end of the B-axis shaft 103 and is engaged by another bevel gear 115 which is disposed in a B-axis rotary body 117. The B-axis rotary body 117 carries at its lower end a laser nozzle 119.

Furthermore, the A-axis and the B-axis rotary bodies 69 and 117 are respectively provided with reflector devices 125 and 127 which respectively include reflectors 121 and 123 for refracting the laser beams LB.

In the configuration described above, when Z-axis drive motor 75 is operative the ball screw nut 65 is rotated through the output shaft, pulley 77, timing belt 81, and pulley 79. By the rotation of the ball screw nut 65, the ball screw spline shaft 63 and the A- and B-axis rotary bodies 69 and 117 move upwardly and downwardly and therefore the laser nozzle 119 moves vertically. During the vertical movement, the nozzle 119 is smoothly guided by the guide bar 99, the pairs of guide rollers 101 and ball spline shaft 63.

In order to rotate the A-axis rotary body 69 about the axis of the ball screw spline shaft 63, or in the A-axis direction, the A-axis drive motor 83 is activated. As a result, the ball spline nut 67 is rotated through the output shaft of the drive motor 83, drive pulley 85, timing belt 89, and pulley 87. By the rotation of the ball spline nut 67, the ball screw spline shaft 63 rotates. Furthermore, the A-axis rotary body 69 rotates in the A-axis direction since the ball spline shaft 63 is fixed to the A-axis rotary body 69. At the moment, the B-axis rotary body 117 also rotates in the A-axis direction since it is attached to the A-axis rotary body 69.

Further, at this time the ball screw spline shaft 63 tends to move in the upward or downward direction, and however the upward or downward movement of the ball screw spline shaft 63 is cancelled or prevented, for example, by rotating the ball screw nut 65 in a direction by suitably operating the Z-axis drive motor 75.

At the same time, B-axis rotary body 117 tends to rotate in a vertical plane and however the rotation of the B-axis rotary body 117 is cancelled by driving the B-axis drive motor 107 in a suitable direction.

In order to rotate the B-axis rotary body 117 in the B-axis direction, the B-axis drive motor 107 is activated. As a result, the B-axis shaft 103 is rotated through the output shaft of the B-axis drive motor 107, driving pulley 109, timing belt 111, and pulley 105. By the rotation of this B-axis shaft 103, the B-axis rotary body 117 is rotated in the B-axis direction through the bevel gears 113, 115. The guide bar 99 secured to the Z-axis base 71 and the pairs of guide rollers 101 attached to the B-axis motor base 97 act as a stopper for preventing the rotation of the B-axis motor base 97 and as a guide means for guiding the B-axis motor base in the Z direction.

The laser beams LB which have passed through the laser pipe 95 are refracted by the reflector 91 to pass through the B-axis shaft 103 disposed in the ball screw spline shaft 63 and then refracted by the reflectors 121 and 123 to be projected downwardly from the laser nozzle 119 onto a workpiece (not shown) for laser processing.

When the workpiece is a three-dimentional figure or solid, the laser processing will be easily performed by moving A- and B-axis rotary bodies 69, 117 not only vertically but also in the A- and B-axis directions.

As described above, the ball screw spline shaft 63 as a laser nozzle supporting shaft is in the shape of a pipe and therefore acts both as a protecting pipe for the laser beams LB and as a rotary shaft when the A-axis rotary body 69 rotates in the A-axis direction. As a result, the laser head device 61 can be lightweight and compact in comparison with conventional ones.

In addition, by this structure, less weight and rationalization of driving and guiding mechanisms of the Z-axis moving body are achieved. Furthermore, there is no protrusion on the laser head device 61, and therefore this gives easy access to a workpiece by the laser head device. Further, relaying slip rings for the motor cable can be omitted.

In addition, since the ball screw spline shaft 63, ball screw nut 65, and ball spline nut 67 are used for driving or moving the laser head device in the Z-axis direction, the driving system becomes simple and enables the laser head to move quickly with precision.

This invention is not limitative to the embodiments described above and can be performed in other manners by making suitable modification to the embodiments. In the embodiments, pulleys and timing belts are used for the transmission of the output of every axis motor. However, other transmission mechanisms such as spur gears and chains may be used. Also, the B-axis motor, which is fixedly attached to an axially rotary body, may be used.

INDUSTRIAL APPLICABILITY

The laser head device of the present invention can be used in view of the advantages that it is lightweight and compact, and also simple in structure.

We claim:

1. A laser head device in a laser processing apparatus, comprising:

a frame of the laser processing apparatus;

a ball screw nut and ball spline nut each rotatably mounted on the frame, both nuts being aligned along a first axis (A);

a pipe-shaped ball screw spline shaft extending along the first axis (A) and inserted in both nuts in such a way as to be rotatable about the first axis (A) and reciprocally movable along the first axis (A), the pipe-shaped ball screw spline shaft being formed with a ball screw groove for engaging with the ball screw nut and a ball spline groove for engaging with the ball spline groove the pipe-shaped ball screw spline shaft being moved along the first axis when the ball screw nut is rotated, the ball screw spline shaft being rotated about the first axis (A) when the ball spline nut is rotated, and the pipe-shaped ball screw spline shaft carrying at a first end thereof a laser nozzle which is provided rotatably about a second axis (B) perpendicular to the first axis (A);

a first motor for rotating the ball screw nut, mounted on a section of the frame next to the ball screw nut;

a second motor for rotating the ball spline nut, mounted on a section of the frame next to the ball spline nut;

a pipe-shaped B-axis shaft for rotating the laser nozzle about the second axis (B), the pipe-shaped B-axis shaft being inserted in the ball screw spline shaft in such a way as to be rotatable about the first axis (A) relative to the ball screw spline shaft, a first end portion of the pipe-shaped B-axis shaft and the laser nozzle coupled to each other for the rotation of the laser nozzle;

a third motor coupled to a second end of the pipe-shaped B-axis shaft for rotating the pipe-shaped B-axis shaft about the first axis (A).

2. The laser head device of claim 1, further comprising a B-axis motor base rotatably supported, through a bearing, on a second end of the pipe-shaped ball screw spline shaft; wherein the third motor is mounted on the B-axis motor base.

3. The laser head device of claim 2, further comprising a guide bar provided on the frame and extending in a direction parallel to the first axis (A), and a pair of rollers provided on the B-axis motor base and engaged with the guide bar so as to be guided by the guide bar.

* * * * *